(12) United States Patent
Smith

(10) Patent No.: US 8,888,569 B2
(45) Date of Patent: Nov. 18, 2014

(54) BIG POULTRY CUT-UP METHOD

(75) Inventor: Hultz Smith, Springdale, AR (US)

(73) Assignee: Tyson Foods, Inc., Springdale, AR (US)

( * ) Notice: Subject to any disclaimer, the term of this patent is extended or adjusted under 35 U.S.C. 154(b) by 445 days.

(21) Appl. No.: 13/245,589

(22) Filed: Sep. 26, 2011

(65) Prior Publication Data

US 2013/0078897 A1 Mar. 28, 2013

(51) Int. Cl.
*A22B 5/16* (2006.01)
*A22C 21/00* (2006.01)

(52) U.S. Cl.
CPC ......... *A22C 21/0023* (2013.01); *A22C 21/0038* (2013.01)
USPC ....................................... 452/125

(58) Field of Classification Search
USPC ......... 452/135, 149, 150, 153, 156, 157, 177, 452/180
See application file for complete search history.

(56) References Cited

U.S. PATENT DOCUMENTS

| | | | |
|---|---|---|---|
| 3,347,680 A * | 10/1967 | Rambold | 452/137 |
| 3,594,189 A | 7/1971 | Panattoni | |
| 3,946,461 A | 3/1976 | Martin | |
| 4,019,223 A | 4/1977 | Baker | |
| 4,067,085 A | 1/1978 | Gasbarro | |
| 4,083,083 A | 4/1978 | Duncan et al. | |
| 4,229,859 A | 10/1980 | Gagliardi, Jr. et al. | |
| 4,306,335 A | 12/1981 | Hawk et al. | |
| 4,328,569 A | 5/1982 | Trott et al. | |
| 4,424,608 A | 1/1984 | Martin | |
| 4,503,587 A | 3/1985 | Martin | |
| 4,536,919 A | 8/1985 | Cashwell et al. | |
| 4,589,165 A | 5/1986 | Lerner et al. | |
| 4,669,148 A | 6/1987 | Scheier | |
| 4,715,092 A | 12/1987 | Lerner et al. | |
| 4,745,658 A | 5/1988 | Lerner | |
| RE32,697 E | 6/1988 | Hazenbroek et al. | |
| 4,930,187 A | 6/1990 | Whittington | |
| 4,993,115 A | 2/1991 | Hazenbrook | |
| 5,021,024 A | 6/1991 | Villemin et al. | |
| 5,088,957 A | 2/1992 | Gagliardi, Jr. | |
| 5,232,397 A * | 8/1993 | Gagliardi, Jr. | 452/169 |
| 5,368,520 A | 11/1994 | Koch et al. | |
| 5,370,573 A | 12/1994 | Warren et al. | |
| 5,378,194 A | 1/1995 | Hjorth | |
| 5,464,368 A | 11/1995 | White et al. | |
| 5,466,186 A | 11/1995 | Hjorth | |
| 5,472,377 A * | 12/1995 | Andrews et al. | 452/149 |
| 5,492,502 A | 1/1996 | Hjorth | |
| 5,525,103 A | 6/1996 | White et al. | |
| 5,591,076 A | 1/1997 | Evers et al. | |
| 5,746,649 A | 5/1998 | Skaar et al. | |
| 5,779,532 A | 7/1998 | Gagliardi, Jr. | |
| 5,810,653 A * | 9/1998 | Van Craaikamp et al. | 452/136 |
| 5,813,908 A * | 9/1998 | Craaikamp | 452/136 |
| 5,932,278 A * | 8/1999 | Gagliardi, Jr. | 426/644 |
| 5,951,392 A | 9/1999 | Gagliardi | |
| 5,961,383 A * | 10/1999 | Janssen et al. | 452/135 |
| 5,976,608 A | 11/1999 | Gagliardi, Jr. | |

(Continued)

*Primary Examiner* — Richard Price, Jr.
(74) *Attorney, Agent, or Firm* — McAfee & Taft

(57) ABSTRACT

A method for cutting extra-large poultry to fit within existing industrial fryers and remain as recognizable pieces to the consumer is provided. The method provides for the cuts necessary to create pieces of poultry from the extra-large poultry that are sized comparably to a normal sized bird. Furthermore, the method provides for keeping the cut pieces in a shape that the consumer recognizes as a particular piece of poultry.

7 Claims, 13 Drawing Sheets

(56) References Cited

U.S. PATENT DOCUMENTS

| | | | |
|---|---|---|---|
| 6,155,919 A | 12/2000 | Haagensen et al. | |
| 6,238,281 B1 | 5/2001 | Gagliardi, Jr. | |
| 6,248,013 B1 | 6/2001 | Thomas et al. | |
| 6,280,311 B1 | 8/2001 | Kuck | |
| 6,319,110 B1 | 11/2001 | Peters et al. | |
| 6,475,076 B1 * | 11/2002 | Rheingans et al. | 452/167 |
| 6,572,467 B1 | 6/2003 | Hirokane | |
| 6,618,156 B2 * | 9/2003 | Kuroiwa | 356/630 |
| 6,688,961 B2 * | 2/2004 | Smith | 452/160 |
| 6,769,977 B2 | 8/2004 | Kuck | |
| 6,921,326 B2 * | 7/2005 | Smith | 452/160 |
| 6,929,541 B2 | 8/2005 | Cervantes et al. | |
| 7,004,830 B2 | 2/2006 | van der Steen et al. | |
| 7,008,313 B2 * | 3/2006 | Gagliardi, Jr. | 452/135 |
| 7,022,007 B2 | 4/2006 | Naehring et al. | |
| 7,022,077 B2 | 4/2006 | Mourad et al. | |
| 7,134,958 B2 * | 11/2006 | Gagliardi, Jr. | 452/149 |
| 7,175,517 B1 | 2/2007 | Weakley | |
| 7,473,166 B2 | 1/2009 | Sbarro | |
| 7,479,296 B2 | 1/2009 | Gagliardi, Jr. | |
| 7,857,687 B2 | 12/2010 | Gagliardi, Jr. | |
| 7,867,069 B2 | 1/2011 | Gagliardi, Jr. | |
| 8,187,061 B2 | 5/2012 | Lobel | |
| 8,348,730 B2 | 1/2013 | Lobel | |
| 8,535,122 B2 * | 9/2013 | Hazenbroek et al. | 452/125 |
| 8,591,298 B1 * | 11/2013 | Watson et al. | 452/135 |
| 2005/0123664 A1 | 6/2005 | Gagliardi, Jr. | |

* cited by examiner

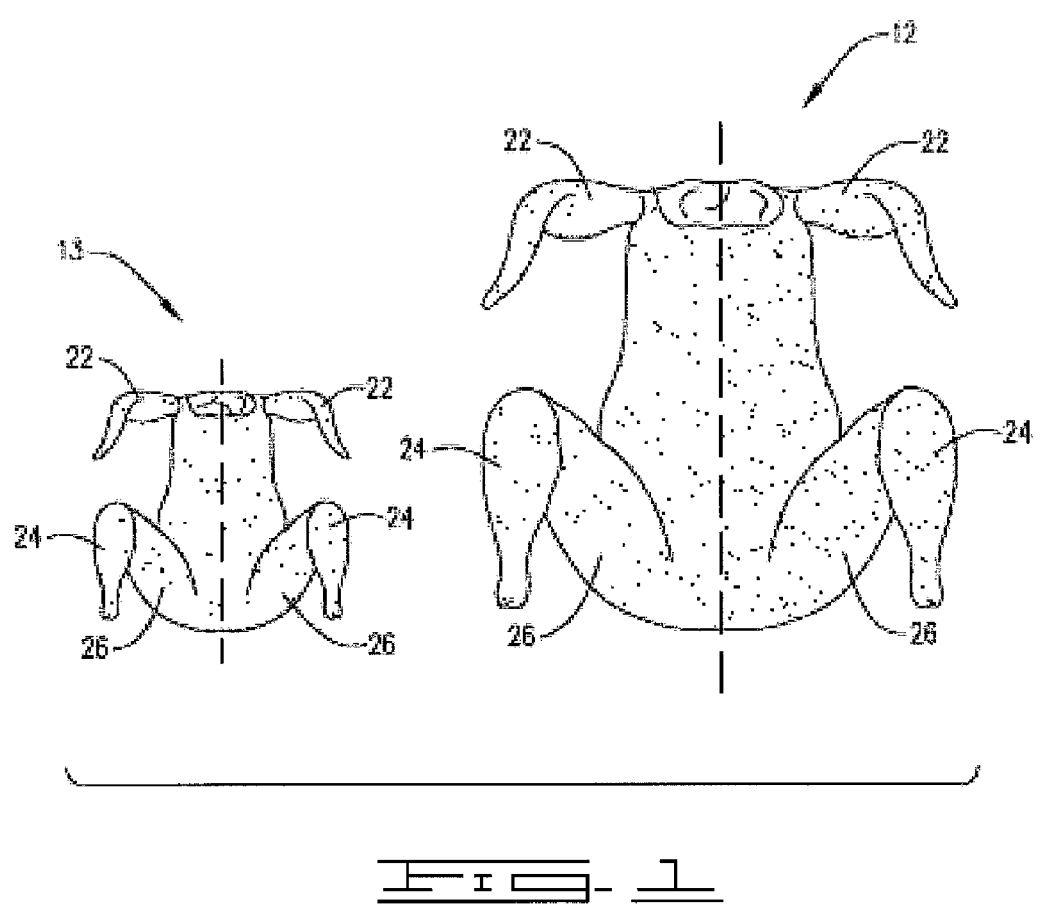

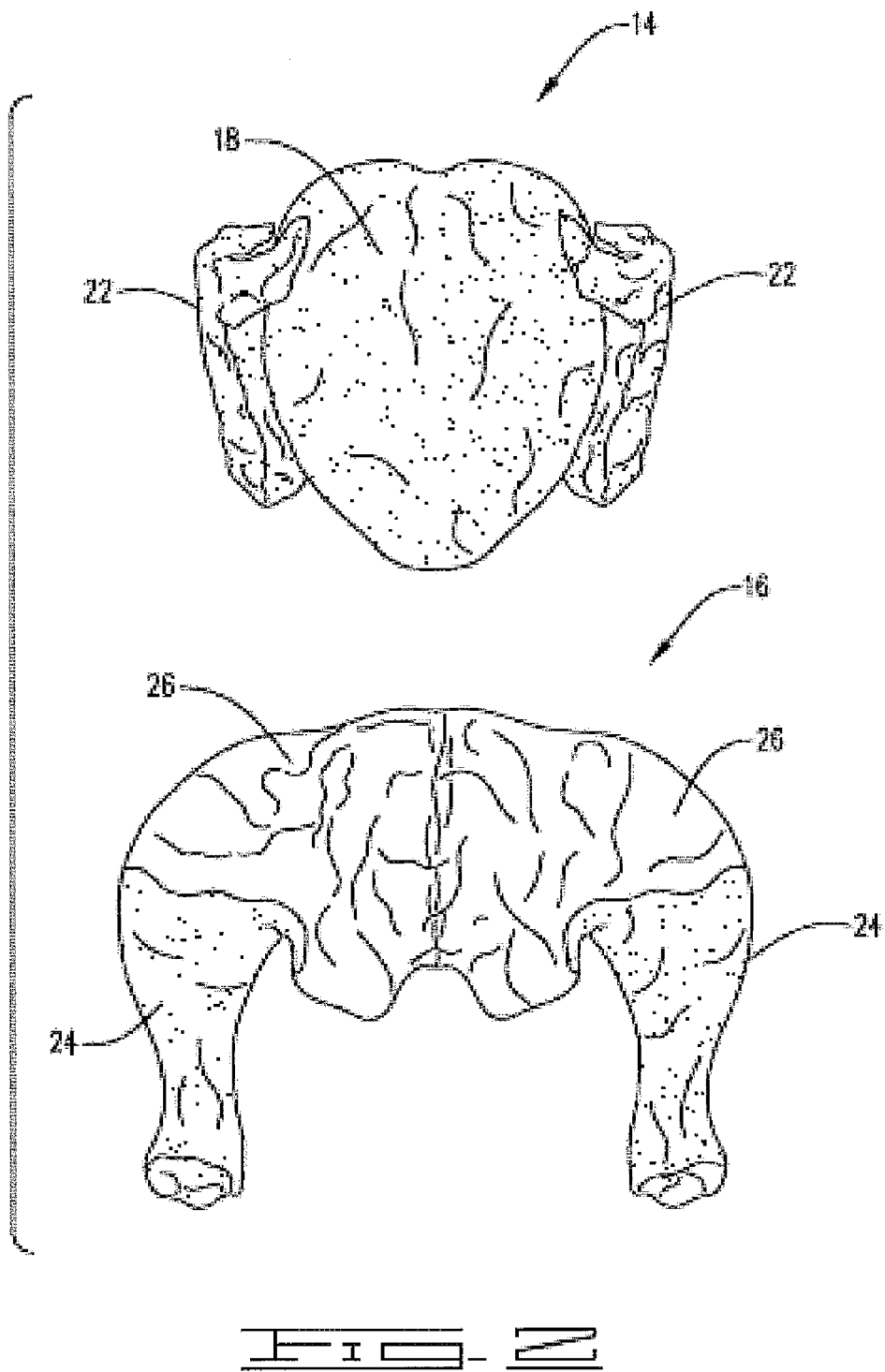

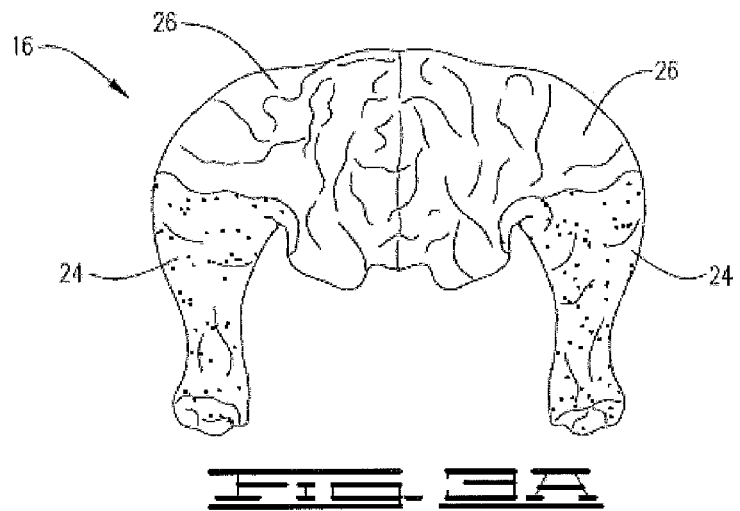
FIG-3A
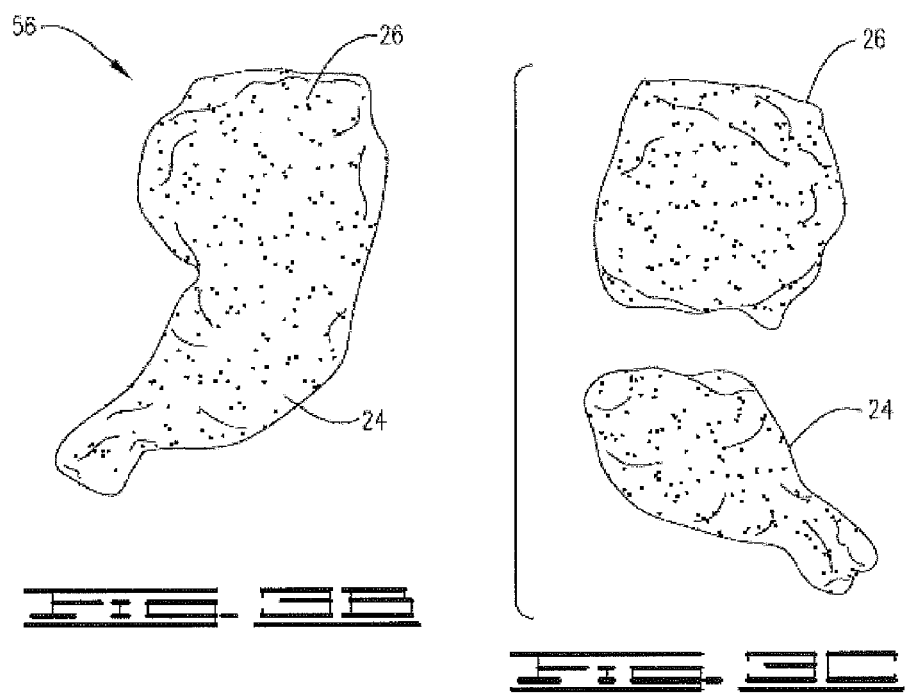
FIG-3B
FIG-3C

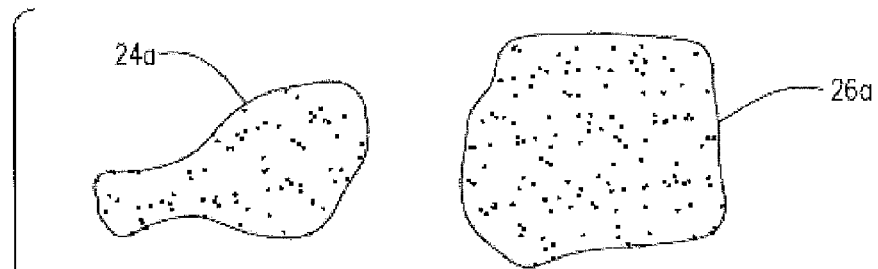
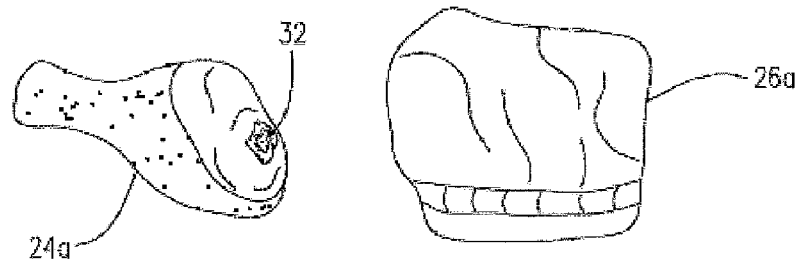
FIG. 4A
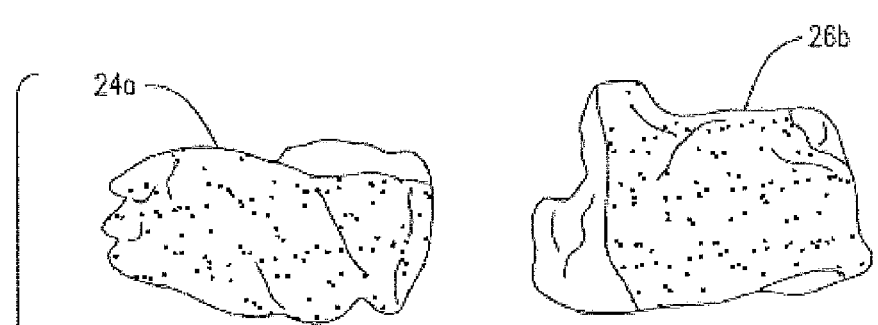
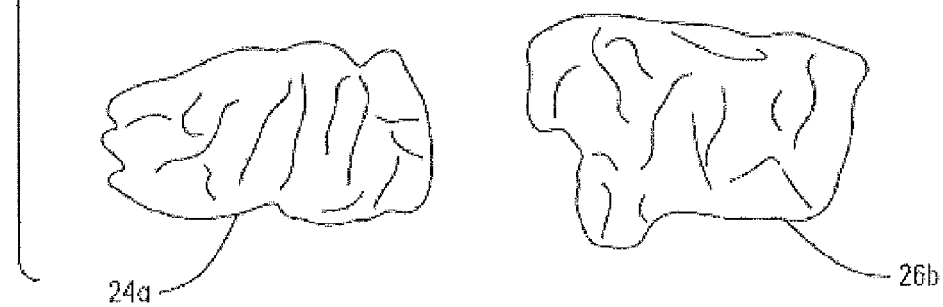
FIG. 4B

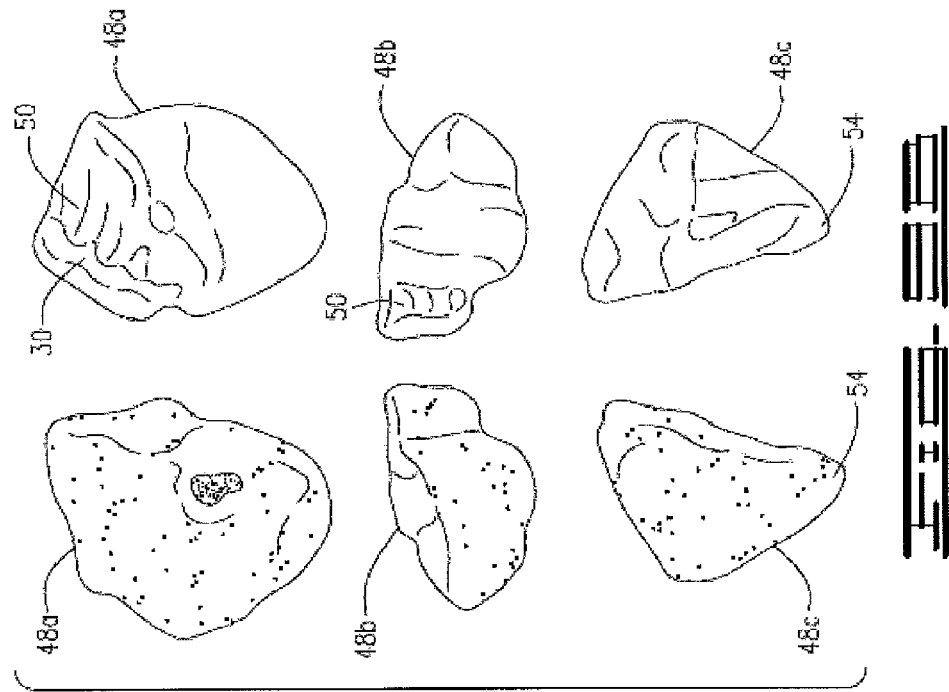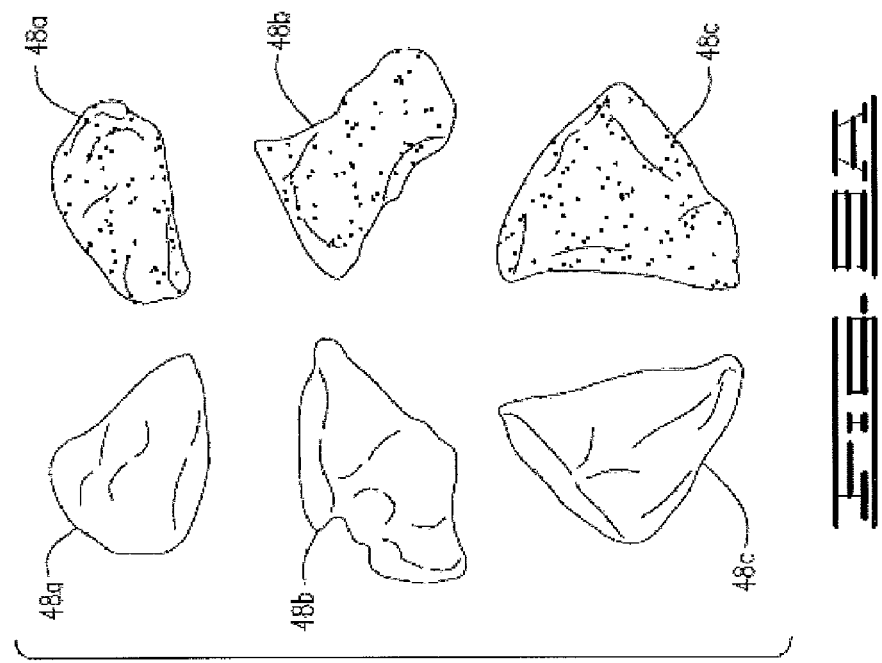

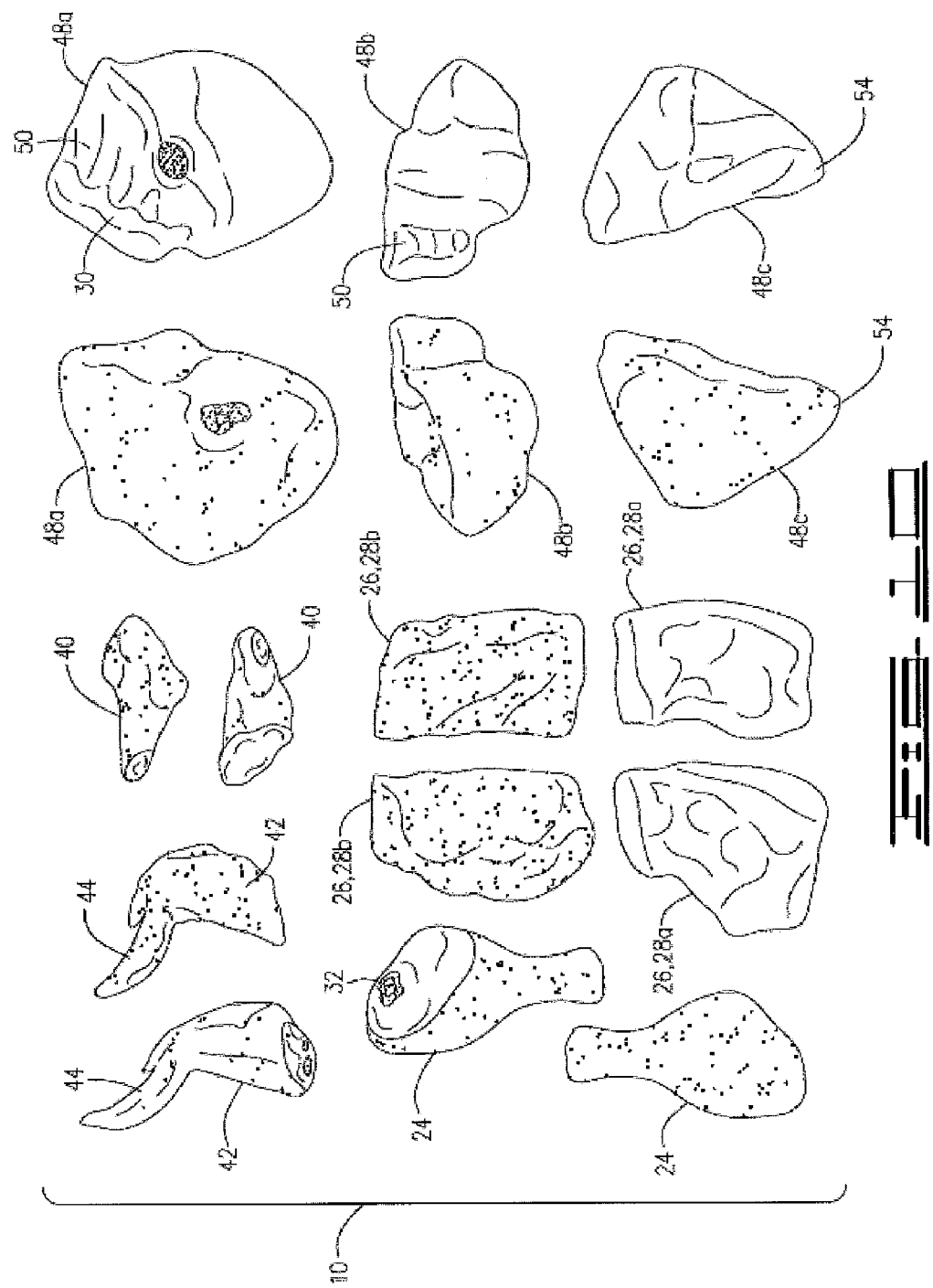

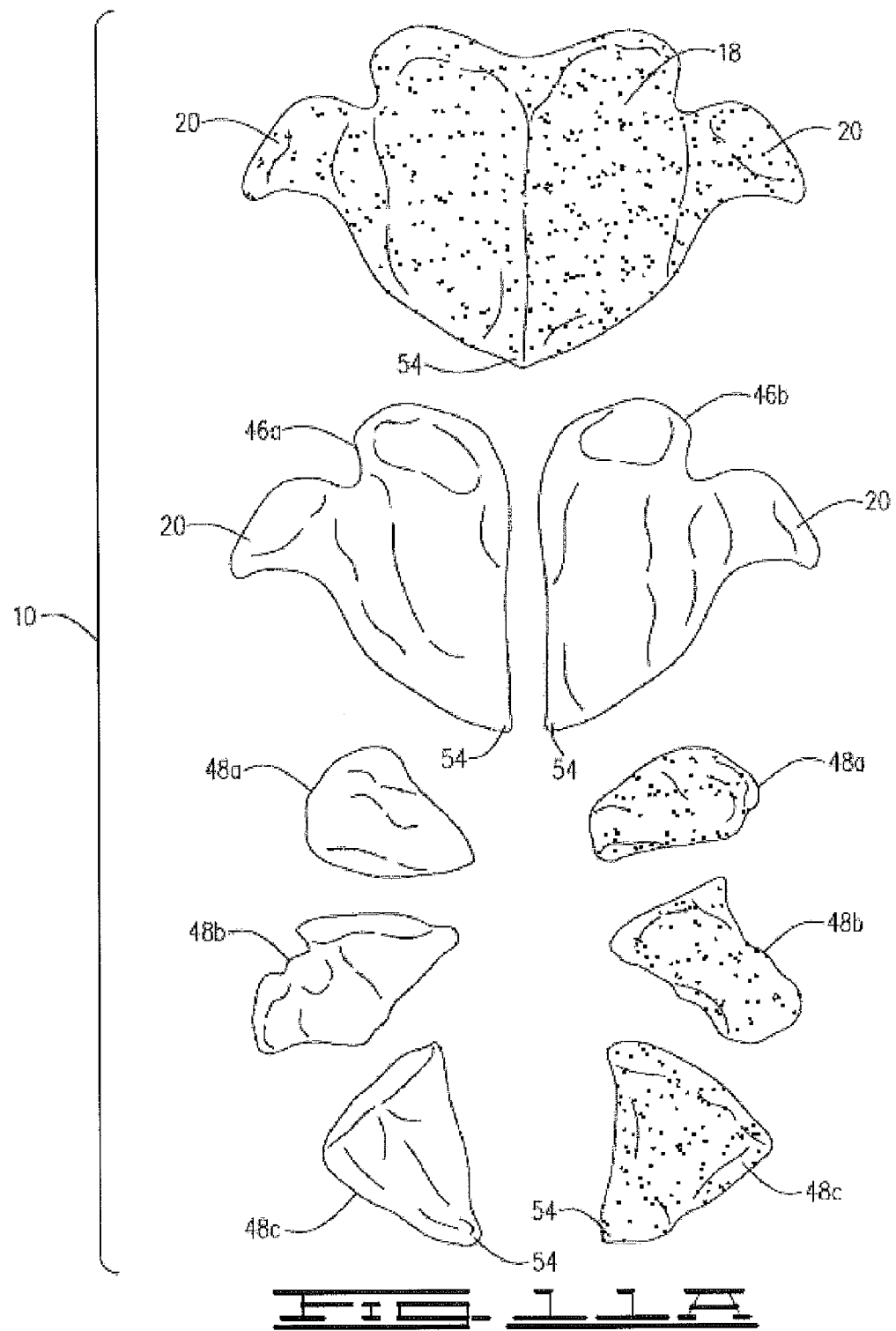

BIG POULTRY CUT-UP METHOD

BACKGROUND OF THE INVENTION

Industrial equipment to fry poultry is designed for birds weighing about three (3) to about four (4) pounds (about 1.3 kilograms to about 1.8 kilograms). Unfortunately, there are too few birds in this weight range to meet the retailers' increased sales demands. To provide for this increased sales demand, poultry producers are using their supply of poultry weighing between about five (5) and about nine (9) pounds (about 23 kilograms to about 4.1 kilograms). However, the resulting cuts of poultry are too large for the fryers, and the cut pieces are unrecognizable to the consumer.

The consuming public is reluctant to buy an end-item poultry product not having the recognizability of a familiar cut. If the cut does not look right, the consumer is often dissatisfied with the product they received. A breast piece must appear as a breast piece and a thigh piece must appear as a thigh piece.

Similarly, packaged poultry in the market must also be presented with cuts that are recognizable to the consumer. Although boneless products have greater latitude for appearance, the aforementioned problems are applicable to both "bone-in" and "boneless" types of cuts.

Therefore, there is a need for new approaches to cutting bigger poultry so that the pieces are sized for use in existing equipment, and for those pieces to retain the appearance of traditional poultry cuts.

SUMMARY OF THE INVENTION

In a first aspect, the inventive method for cutting a poultry carcass comprises the following steps:
   (a) separating a leg and a thigh from a first and a second side of the poultry carcass;
   (b) separating each leg from each thigh;
   (c) separating a wing from the first and second sides of the poultry carcass, wherein the wing includes a drumette and a flat with a flipper;
   (d) separating the drumette from the flat and flipper;
   (e) separating a breast portion from the poultry carcass;
   (f) butterflying the breast;
   (g) splitting the breast into two halves; and
   (h) splitting each breast half into at least three pieces, the three pieces being about the same size.

In a second aspect, the inventive method for cutting a poultry carcass comprises the following steps:
   (a) removing a leg and a thigh from each side of the poultry carcass;
   (b) deboning the thigh and leg;
   (c) cutting the leg meat from the thigh meat;
   (d) cutting the thigh meat into two substantially equal halves;
   (e) removing a wing from each side of the poultry carcass, wherein the wing includes a drumette and a flat with a flipper;
   (f) removing the drumettes from the flats with the flippers;
   (g) removing the flippers from the flats
   (h) separating a breast section from the poultry carcass;
   (i) butterflying the breast section;
   (j) deboning the breast section;
   (k) cutting the breast meat into two halves; and
   (l) cutting each breast half into at least three pieces.

In another aspect, the inventive method for right-sizing an extra-large chicken for industrial fryers comprises the following steps:
   (a) cutting a chicken into pieces using at least fourteen (14) cuts, wherein the resulting pieces include:
      (i) at least two leg pieces;
      (ii) at least two thigh pieces;
      (iii) at least two wing drumette pieces;
      (iv) at least two wing flat pieces;
      (v) at least six breast pieces; and
   (b) right-sizing the pieces to fit within an existing industrial fryer, wherein each breast piece and thigh piece is comparably sized with breast and thigh pieces from a chicken about one-half the size of the extra-large chicken.

In yet another aspect, the inventive method for cutting a poultry carcass comprises the following steps:
   (a) separating a hind saddle from a fore saddle of the poultry carcass, wherein the poultry carcass includes at least a breast, a plurality of rib bones, a leg, a thigh, and a backbone, wherein the breast forms a breast cavity associated with the poultry carcass, and the separating step further includes the steps of:
      (i) removing a tail from the poultry carcass;
      (ii) cutting into the breast cavity between the rib bones and the leg and thigh, wherein the cutting is sufficiently deep to define a bend in the backbone between the fore saddle and the hind saddle;
      (iii) cutting the backbone at the bend;
   (b) separating the hind saddle into separate pieces, the hind saddle includes at least a leg quarter having the leg and thigh, the thigh having a femur bone, which is connected to the leg at a knee joint located between the leg and thigh, wherein the separating step further includes the steps of:
      (i) separating the leg quarter at a midline of the backbone;
      (ii) separating the leg from the thigh at the knee joint;
      (iii) cutting the thigh into about two equal pieces, wherein the cutting includes cutting perpendicular to the backbone and continuing parallel to the femur;
   (c) separating the fore saddle into separate pieces, the fore saddle including the breast, a keel, the backbone, a wing having a humerus bone connected to a wing socket, a drumette, a flat, and a flipper, wherein the separating step further includes the steps of:
      (i) removing the wings from the breast where the humerus bone connects to the wing socket, the wing socket being connected to a bone when the breast has the bone in the breast;
      (ii) cutting the flipper off of the wings;
      (iii) separating the drumette from the flat at a joint therebetween;
      (iv) splitting the breast with the bone in the breast into a pair of breast halves, the separating occurring along a midline of the keel and backbone; and
      (v) cutting each breast half into about three equal portions, wherein a keel piece is created by cutting the breast half perpendicularly to the backbone and in front of a last rib, a center cut is created by cutting the remaining breast half portion perpendicularly to the backbone and in front of the wing socket, thereby leaving a breast piece with ribs as the third piece.

BRIEF DESCRIPTION OF THE DRAWINGS

FIG. 1 is a front view of a normal poultry carcass and an extra-large poultry carcass positioned side-by-side for comparison. The illustrated poultry carcasses are eviscerated and have a fully clean body cavity.

FIG. 2 is an exploded view of a poultry carcass separated into a fore saddle and a hind saddle.

FIG. 3A is an illustration of the hind saddle prior to the hind saddle being further processed.

FIG. 3B is an illustration of a combined leg and thigh, also referred to as the leg quarter, after separation from the hind saddle and having the bone-in. The leg and thigh are illustrated with the skin.

FIG. 3C is an illustration of both poultry legs and thighs separated from each other. The leg and thigh are illustrated with the skin.

FIG. 4A is an exploded view of the bone-in leg separated from thigh. The legs are illustrated as still having the skin. One thigh is illustrated as still having the skin and the other as having the skin partially removed.

FIG. 4B is an exploded view of the boneless leg separated from boneless thigh. One leg is illustrated as still having the most of the skin and the other is illustrated as having no skin. One thigh is illustrated as still having most of the skin and the other as having no skin.

FIG. 5C also illustrates the meat-side of the breast portion. The back portion is illustrated on the right side of FIG. 5C, which also illustrates the skin-side of the breast portion.

FIG. 9A is a plan view of each boneless breast portion cut into three pieces. The breast pieces on the left side of FIG. 9A are presented meat-side up and the breast pieces on the right side of FIG. 9A are presented with skin-side up.

FIG. 9B is a plan view of each bone-in breast portion cut into three pieces. The breast pieces on the left side of FIG. 9B are presented skin-side up and the breast pieces on the right side of FIG. 9B are presented with meat-side up. The breast pieces on the top, right side of FIG. 9B include a portion of the backbone and ribs. The breast pieces on the middle, right side of FIG. 9B include a portion of the ribs.

FIG. 10 is a top view of bone-in poultry pieces.

FIG. 11A is a top view of boneless breast meat progressing from the butterflied condition, the separation of the breast into to large pieces, and the separation of each breast piece into smaller, individual pieces.

DETAILED DESCRIPTION

Figure 4C:
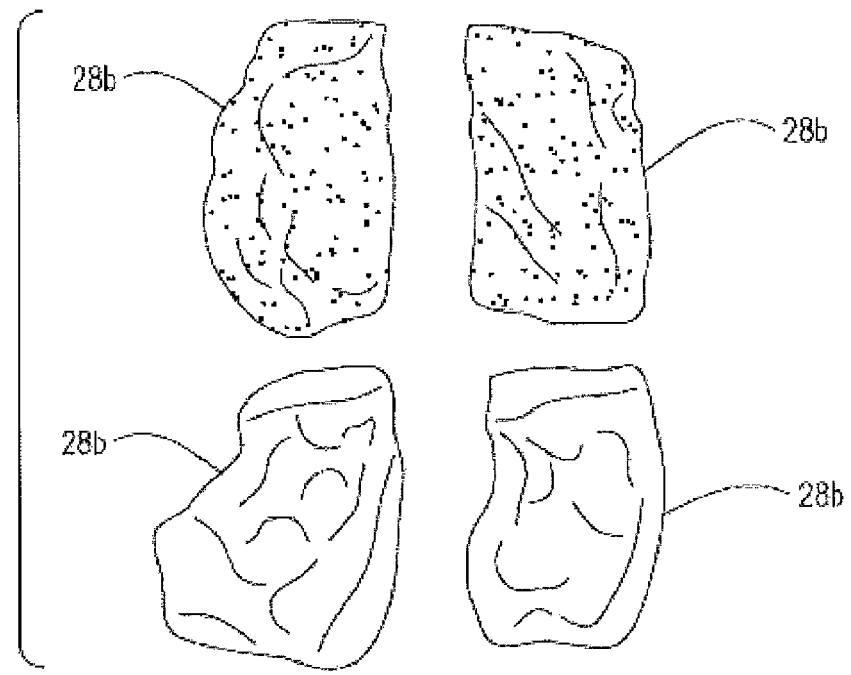
FIG. 4C is an exploded view of the bone-in thigh cut into two pieces. The skin-side illustrated on top is approximately one-half of the thigh and the meat-side illustrated on bottom is the other one-half of the thigh. The meat-side illustration includes a portion of the rib meat.

Referring to the drawings, the inventive method is illustrated and generally designated by the numeral 10. As shown by the drawings and understood by those skilled in the art, inventive method 10 provides a method for cutting large poultry, and the applicable steps therefor, such that poultry pieces are right-sized to fit within industrial fryers and remain recognizable by the consumer. Poultry carcass 12 may be any poultry, but for ease in understanding the invention, a chicken is used in the some of the following illustrations. As referred to herein, poultry carcass 12 is eviscerated and has a fully cleaned body cavity.

Referring to FIGS. 1-6, the steps of separating parts of poultry carcass 12 involve cutting. Cutting may include separating the parts of poultry carcass 12, removing the parts of poultry carcass 12, severing the parts of poultry carcass 12, or other similar descriptions. Extra-large poultry carcass 12 in FIG. 1 is presented to the right of normal poultry carcass 13 for illustration purposes only. Poultry carcass 12 is any large bird capable of satisfying the requirements of this inventive method.

In operation, poultry carcass 12 is positioned on a cutting device. When using poultry carcass 12 that is identified as extra-large, the bird weighs between about five (5) and about nine (9) pounds (about 2.3 kilograms to about 4.1 kilograms) without giblets (WOG).

The cutting device may be any cutting device used in the industry, which includes numerically controlled water jets, rotary knives, band saws, hand-held knives, shears and combinations thereof. Once poultry carcass 12 is positioned on the cutting device, the order of the steps to create poultry pieces that are right-sized for existing industrial equipment and recognizable by the consumer is dependent upon the particular capability of the cutting device. The order of the steps may vary depending upon the cutting device. Preferably, the cutting device is automated to allow for rapid processing of poultry carcass 12.

FIG. 2 illustrates separated fore saddle 14 and hind saddle 16. Fore saddle 14 and hind saddle 16 are separated from poultry carcass 12 using industry practices.

Figure 5A:
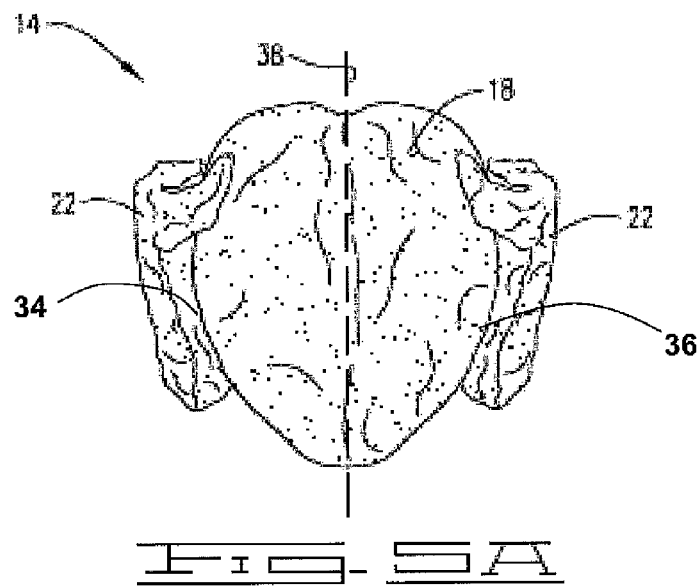
FIG. 5A is an illustration of the fore saddle. The fore saddle is illustrated with skin.
Figure 5B:
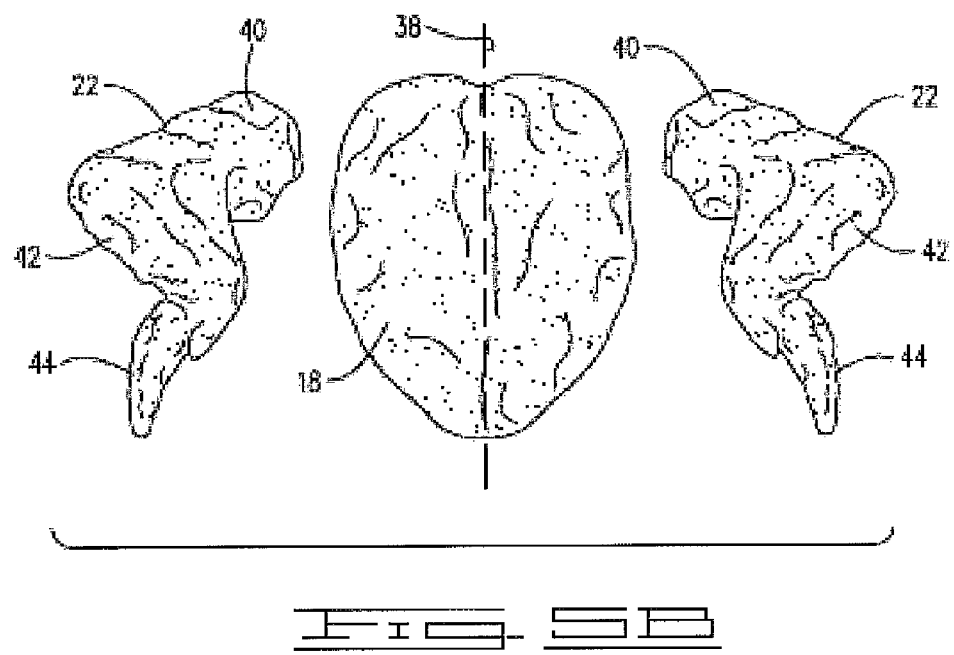
FIG. 5B is an illustration of the fore saddle with the wings separated from the breast portion. The fore saddle and wings are illustrated with skin. The center cut-line for the fore saddle is also illustrated.
Figure 5C:
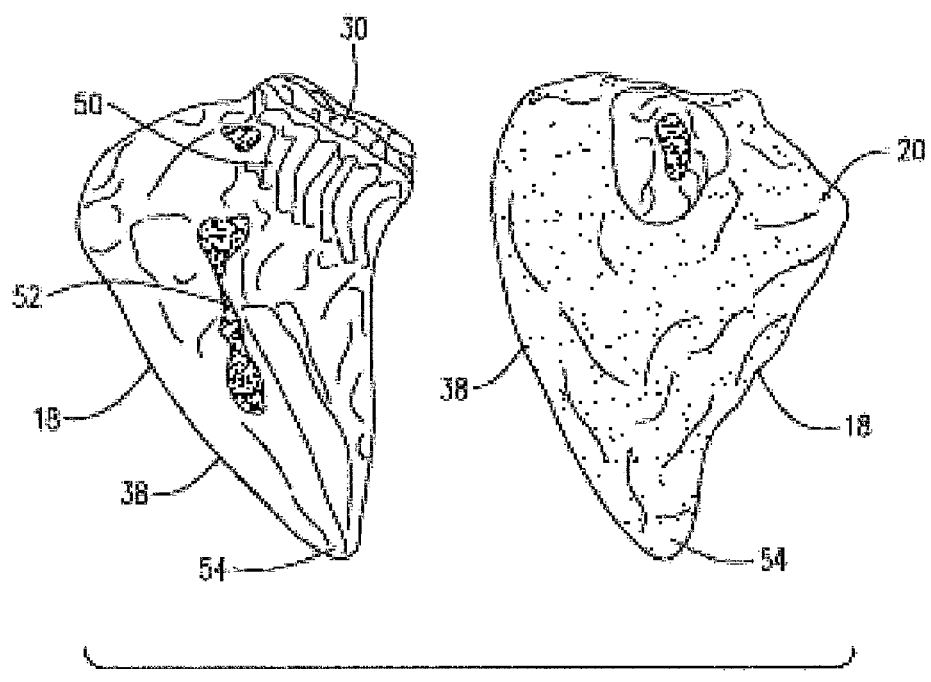
FIG. 5C is an illustration of the breast portion separated into two portions. The backbone, ribs and breast bone are illustrated in the breast portion on the left side of FIG. 5C.

Fore saddle 14 includes breast 18, back 20 and wings 22. Hind saddle 16 includes legs 24 and thighs 26. FIGS. 3A-3C illustrate hind saddle 16, hind saddle 16 separated into combined leg 24 and thigh 26, and separated leg 24 and thigh 26. Leg 24 and thigh 26 are separated using a cutting device. FIGS. 5A and 5B illustrate fore saddle 14 separated into combined breast 18 and back 20 with separated wings 22. FIG. 5C illustrates a split breast 18 and back 20.

Figure 4D:
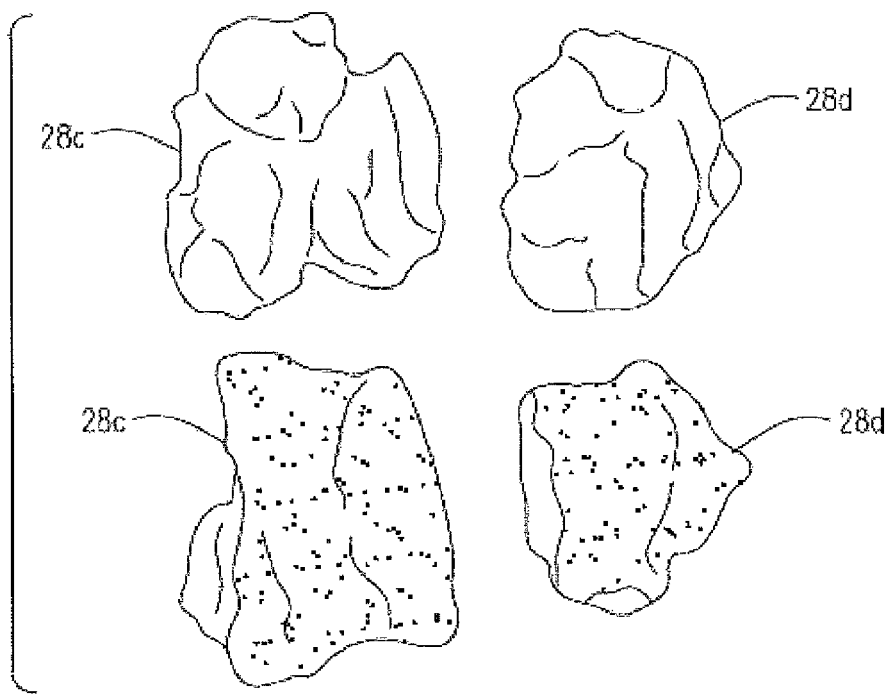
FIG. 4D is an exploded view of the boneless thigh cut into two pieces. The meat-side illustrated on top is one thigh split into two pieces. The skin side illustrated is the other thigh split into two pieces.
Figure 11B:
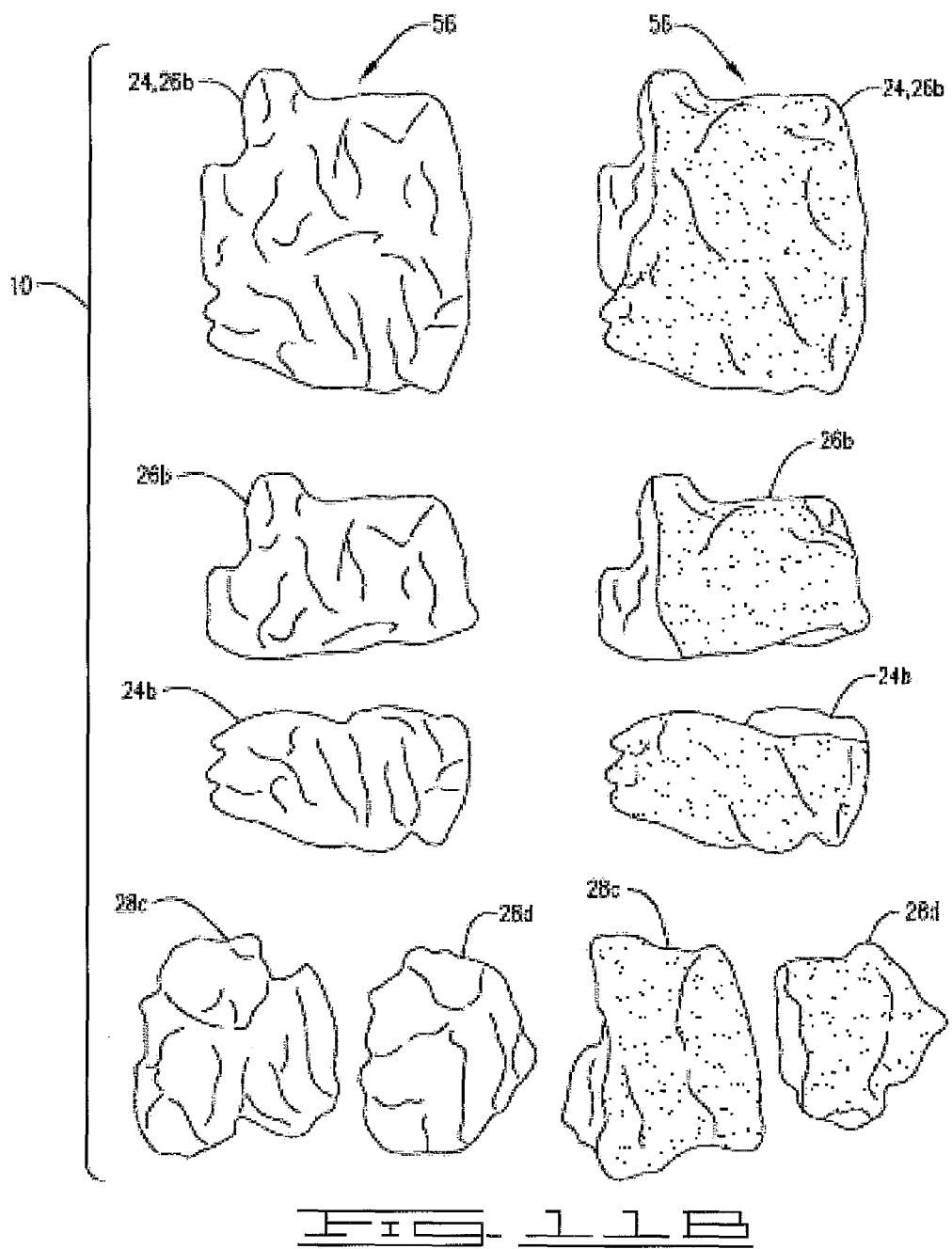
FIG. 11B is a top view of boneless dark meat progressing from the filleted stage of the combined leg and thigh pieces, to the separated leg and thigh pieces, and to separation of the thigh pieces into smaller, individual pieces.

Referring to FIGS. 4A-4D, 10, 12 and 13B, leg 24 is depicted as being separated from thigh 26. FIG. 4A illustrates leg 24a and thigh 26a with the bone-in. Leg 24a is separated from thigh 26a. When creating a boneless cut, the bone is removed using industry practices. As illustrated in FIG. 4B, boneless leg 24b and boneless thigh 26b are deboned prior to separating the meat of boneless leg 24b and boneless thigh 26b. Once thigh 26a and/or 26b is separated from leg 24, it is further cut into to substantially equal thigh halves, as illustrated in FIGS. 4C and 4D. Thigh 26a is illustrated as having two substantially equal thigh halves 28a and 28b in FIG. 10. In FIG. 10, thigh half 28a contains meat from thigh 26, the backbone 30, and femur bone 32 (substituting for a rib) of poultry carcass 12, and thigh half 28b contains the backbone 30 meat only from thigh 26. Boneless thigh 26b is illustrated in FIG. 11B as two substantially equal thigh halves 28c and 28d.

The substantially equal thigh halves 28a-d of thighs 26a and 26b are cut to appear as easily recognizable poultry parts for the consumer, and to fit within existing industrial fryers. Each substantially equal half of boneless thigh 26b takes as long to cook as a normal sized thigh 26 from a normal sized poultry carcass 12.

Referring to FIG. 5A, fore saddle 14 is illustrated with first side 34 and second side 36, having wings 22 still attached thereto. FIG. 5B illustrates fore saddle 14 with wings 22 separated from first and second sides 34 and 36. Wings 22 are separated using the cutting equipment described above. FIG. 5C illustrates breast 18 and back 20 split down middle 38 of fore saddle 14.

Figure 6:
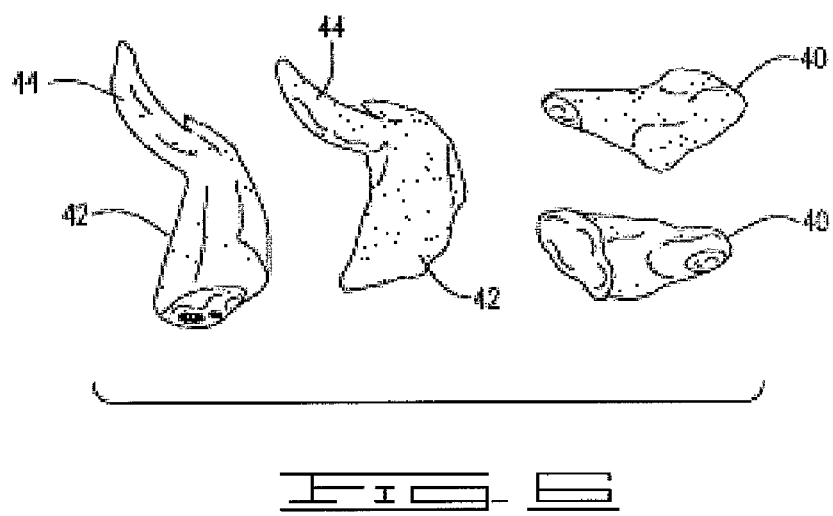
FIG. 6 is an exploded view of the wing with the drumette separated from the wing flat with a flipper. The drumette and wing flat with flipper are illustrated with skin.

As part of the process for separating the pieces into smaller and recognizable parts, wing 22 is further separated into smaller parts. Referring to FIG. 6, drumette 40 is illustrated as being separated from flat 42 with flipper 44 of wing 22.

Figure 7:
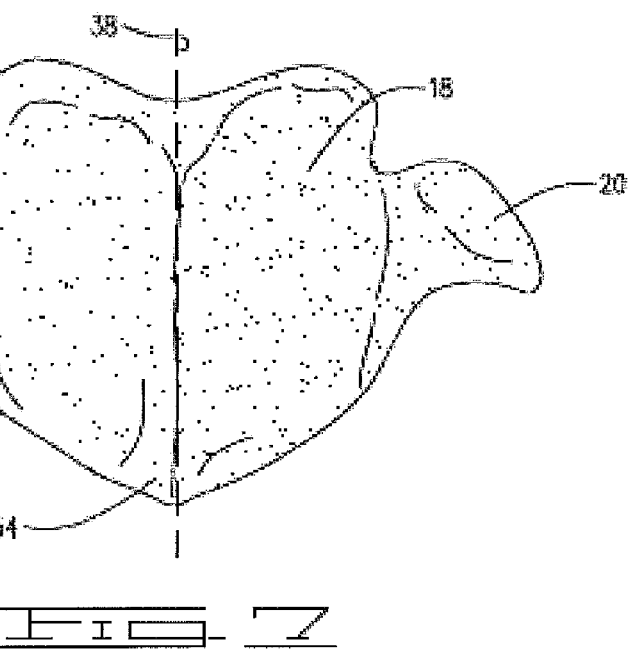
FIG. 7 is a plan view of the bone-in butterfly breast portion. The breast portion is illustrated with skin. Additionally, the breast portion includes a portion of the back meat with skin.
Figure 8A:
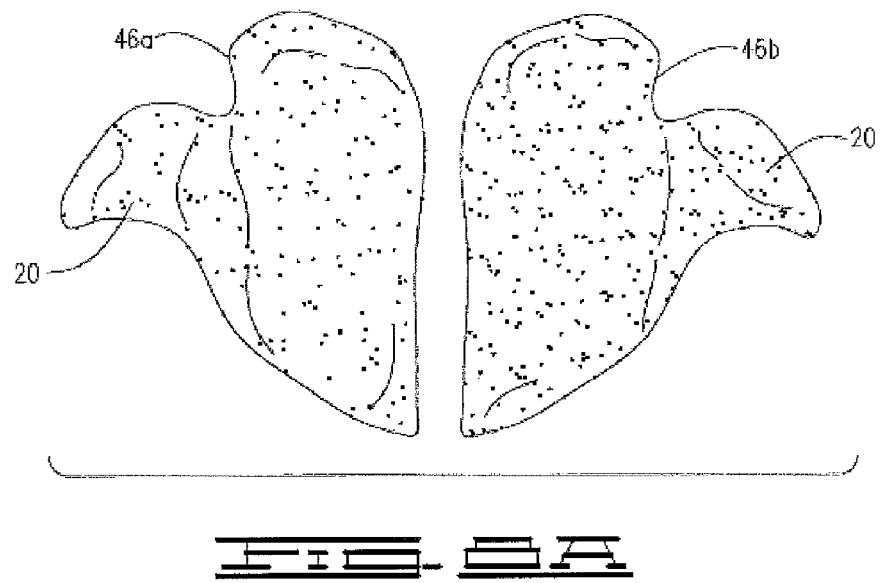
FIG. 8A is a plan view of the bone-in separated breasts from the butterflied breast portion in FIG. 7.
Figure 8B:
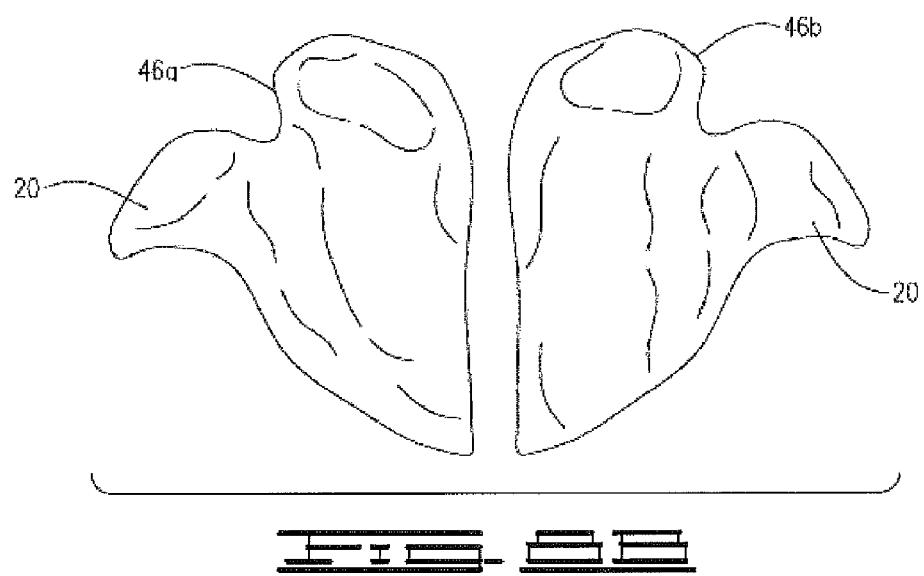
FIG. 8B is a plan view of the separated boneless breast portion with the skin removed.

Referring to FIGS. 5A-11A, and in particular to FIG. 5B, fore saddle 14 is split along back 20 and butterflied using industry practices. The butterflied fore saddle 14 is illustrated in FIG. 7 with the bone-in. FIG. 8A illustrates the butterflied bone-in breast 18 split down middle 38. If breast portion 18 is to be boneless, breast portion 18 is further separated from the bone using industry practices. FIG. 8B illustrates butterflied boneless breast 18 split down middle 38.

Referring to FIGS. 9A-11A, breast portion 18 is split into two breast halves 46a and 46b. Each breast half 46a and 46b is cut into at least three breast pieces 48a, 48b and 48c.

Similar to boneless thigh 26b, breast pieces 48a, 48b and 48c are cut to visually resemble recognizable breast pieces of a normal sized poultry carcass 13. Additionally, breast pieces 48a, 48b and 48c are sized to fit within existing industrial fryers such that the breast meat cooks at the same rate as a normal sized breast piece from a normal sized poultry carcass 13.

Referring to FIG. 10, using the inventive method, a finished set of bone-in pieces of poultry carcass 12 is illustrated. Breast pieces 48a include rib bones 50. Breast pieces 48b include a portion of breastbone 52. Breast pieces 48c include keel portion 54 of breast portion 18. As illustrated, there are at least two legs 24, at least two thighs 26, at least two wing drumettes 40, at least two wing flats 42 with flippers 44, and at least six breast pieces 48a-c. This embodiment right-sizes poultry carcass 12 by using 14 to 16 cuts to provide 14 to 16 pieces of poultry.

Referring to FIG. 11A, breast portion 18 is illustrated in stages of cutting after separation from poultry carcass 12. As illustrated, breast portion 18 is deboned prior to splitting it into breast halves 46a and 46b. The deboning process may occur as defined by the industry practices and/or the particular cutting device used.

Halves 46a and 46b are illustrated with the breast shoulder, which is breast piece 48a. The breast center is illustrated as breast pieces 48b. The breast tip, or keel, is illustrated as breast piece 48c. Breast pieces 48a-c have the recognizable appearance of breast pieces from a normal size bird.

Referring to FIG. 11B, boneless leg 24b and boneless thigh 26b are illustrated. The deboned combined poultry part is illustrated as combined leg and thigh 56, or boneless leg quarter 56. Bone-in leg quarter 56 is illustrated in FIG. 3B as combined leg and thigh 56. Boneless leg 24b and boneless thigh 26b are separated. As discussed above, boneless thigh 26b is further separated into substantially equal thigh halves 28c and 28d. Thigh halves 28c and 28d have the recognizable appearance of a thigh from a normal size poultry carcass 13.

In many embodiments, it is desirable to retain the skin on poultry carcass 12 and the resulting pieces. This provides a crispier, more genuine fried poultry experience for the consumer. However, many consumers prefer a skinless product. Accordingly, the inventive method also provides for removing the poultry carcass skin using industry accepted practices.

In the boneless embodiment, the pieces resulting from this inventive method provide the consumer with the experience of eating poultry as if it were on the bone, but without the inherent problem found in dealing with the bone. It offers a sensory experience of eating cooked poultry, but with the convenience of a boneless product. However, because the pieces of poultry have the appearance of traditional pieces of poultry, the consumers are satisfied they are purchasing the actual product they desire.

In another embodiment, the method of cutting poultry carcass 12 includes first separating hind saddle 16 from fore saddle 14. Poultry carcass 12 includes breast 18, a plurality of rib bones 50, a leg, a thigh, and backbone 30. Breast 18 forms a breast cavity associated with poultry carcass 12. The separating step further includes the steps of removing a tail (not shown) from poultry carcass 12. The breast cavity is cut between rib bones 50, and leg 24 and thigh 26. The cutting is sufficiently deep to define a bend in backbone 30 between fore saddle 14 and hind saddle 16. Backbone 30 is cut at the bend defined thereon.

Hind saddle 16 is separated into separate pieces. Hind saddle 16 includes at least a leg quarter 56 having leg 24 and thigh 26. Thigh 26 has a femur bone, which is connected to leg 24 at a knee joint located between leg 24 and thigh 26. The separating step further includes the steps of separating leg quarters 56 at a midline (not shown) of backbone 30, and then separating leg 24 from thigh 26 at the knee joint. Thigh 26 is cut into about two equal pieces. The cutting includes cutting perpendicular to backbone 30 and continuing to cut parallel to the femur.

Fore saddle 14 is separated into separate pieces. Fore saddle 14 includes at least breast 18, keel portion 54 (also called keel 54), backbone 30, and wing 22. Wing 22 has a humerus bone connected to a wing socket, drumette 40, flat 42, and flipper 44. The separating step further includes the steps of removing wings 22 from breast 18 where the humerus bone connects to the wing socket, the wing socket being connected to a bone when breast 18 has the bone-in-the-breast. Flipper 44 is cut off of the wings. Drumette 40 is separated from flat 42 at a joint therebetween. Breast 18, having the bone-in-the-breast, are split into a pair of breast halves 46a and 46b. The separating occurs along middle 38, also referred to as midline 38 of keel 54, and backbone 30. Each breast half 46a and 46b is cut into about three equal portions. Keel portion 54, or keel piece 54, is created by cutting breast half 46a or 46b perpendicular to backbone 30, and in front of a last rib bone 50. A center cut is created by cutting the remaining breast half portion 46a or 46b perpendicular to backbone 30 and in front of the wing socket. The third breast piece 18 is the remaining breast half portion 46a or 46b with rib bones 50 and rib meat.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims. Thus, the present invention is well adapted to carry out the objects and attain the ends and advantages mentioned and alluded to, as well as those which are inherent therein.

What is claimed is:

1. A method for cutting a poultry carcass comprising:
separating the poultry carcass into a fore saddle and a hind saddle;
separating the hind saddle into two equal halves, each half having a leg and thigh;
separating each leg from each thigh;
separating a wing from a first and second side of the fore saddle, wherein the wing includes a drumette and a flat with a flipper attached to the flat;
separating the drumette from the flat with flipper;
separating the fore saddle into two breast portions halves, the breast portions including meat from a back of the poultry carcass;
splitting each breast half into at least three pieces, the three pieces being about the same size, wherein the poultry is an extra-large chicken weighing between about 5 pounds and about 9 pounds (about 2.3 kilograms to about 4.1 kilograms) without giblets.

2. The method of claim 1, further comprising cutting the thigh meat into two substantially equal halves.

3. The method of claim 1, further comprising the step of deboning the leg and thigh prior to separating the leg from the thigh.

4. The method of claim 1, further comprising the step of removing the breast meat from the bone prior to splitting the breast into two halves.

5. The method of claim 1, further comprising sizing each breast piece into a usable size for an industrial fryer.

6. The method of claim 5, wherein the sizing further comprises keeping the breast piece in a consumer recognizable shape.

7. The method of claim 1, further comprising the step of removing the skin from the meat.

* * * * *

UNITED STATES PATENT AND TRADEMARK OFFICE
CERTIFICATE OF CORRECTION

| | | |
|---|---|---|
| PATENT NO. | : 8,888,569 B2 | |
| APPLICATION NO. | : 13/245589 | |
| DATED | : November 18, 2014 | |
| INVENTOR(S) | : Hultz Smith | |

It is certified that error appears in the above-identified patent and that said Letters Patent is hereby corrected as shown below:

In the Specification

In Column 1, line 12, delete "23" and insert --2.3-- therefor.

Signed and Sealed this
Thirtieth Day of June, 2015

Michelle K. Lee
*Director of the United States Patent and Trademark Office*